United States Patent
Koike-Akino et al.

(10) Patent No.: US 9,264,118 B1
(45) Date of Patent: Feb. 16, 2016

(54) SYSTEM AND METHOD FOR COMMUNICATING DATA SYMBOLS VIA WIRELESS DOUBLY-SELECTIVE CHANNELS

(71) Applicant: Mitsubishi Electric Research Laboratories, Inc., Cambridge, MA (US)

(72) Inventors: Toshiaki Koike-Akino, Malden, MA (US); Philip Orlik, Cambridge, MA (US); Kyeong Jin Kim, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/635,309

(22) Filed: Mar. 2, 2015

(51) Int. Cl.
| | | |
|---|---|---|
| H04L 1/02 | (2006.01) | |
| H04B 7/04 | (2006.01) | |
| H04L 1/00 | (2006.01) | |
| H04L 1/06 | (2006.01) | |
| G06K 9/40 | (2006.01) | |
| H04L 27/26 | (2006.01) | |

(52) U.S. Cl.
CPC ............ *H04B 7/0456* (2013.01); *H04B 7/0413* (2013.01); *H04L 1/0058* (2013.01); *G06K 9/40* (2013.01); *H04L 1/0054* (2013.01); *H04L 1/0612* (2013.01); *H04L 1/0625* (2013.01); *H04L 27/2647* (2013.01)

(58) Field of Classification Search
CPC ...... G06K 9/40; H04B 7/0413; H04L 1/0054; H04L 1/0061; H04L 1/0612; H04L 1/0625; H04L 27/2647

USPC .................................. 375/267, 299, 347, 349
See application file for complete search history.

(56) References Cited

U.S. PATENT DOCUMENTS

| | | | |
|---|---|---|---|
| 6,363,121 B1 | 3/2002 | Hochwald et al. | |
| 6,587,515 B1 | 7/2003 | Jafarkhani | |
| 6,693,976 B1 | 2/2004 | Hassibi et al. | |
| 6,801,579 B1 | 10/2004 | Hassibi et al. | |

(Continued)

FOREIGN PATENT DOCUMENTS

EP 2363985 B1 12/2012

OTHER PUBLICATIONS

Tugnait et al. "Doubly Selective Channel Estimation using Exponential Basis Models and Subblock Tracking." IEEE Transactions on Signal Processing, vol. 58, No. 3, Mar. 2010.

*Primary Examiner* — Leila Malek
(74) *Attorney, Agent, or Firm* — Dirk Brinkman; Gene Vinokur

(57) ABSTRACT

A method for decoding data symbols modulated with a corresponding codeword from a constellation set of codewords expands the constellation set of codewords with a set of basis functions to produce a basis-expanded constellation set and projects projecting a received modulated data symbol onto orthogonal complements of the basis expanded constellation set to obtain a set of distance metric of a generalized likelihood ratio test (GLRT) for each codeword of the constellation set. The set of basis functions includes a Fourier exponential basis function in a frequency domain, a Legendre polynomial basis function in a time domain, and a Fourier-Legendre product basis function in the frequency domain. The method selects a codeword corresponding to a minimal distance metric or a maximal correlation metric and decodes the data symbol from the received modulated data symbol using the codeword.

20 Claims, 7 Drawing Sheets

(56) References Cited

U.S. PATENT DOCUMENTS

| | | |
|---|---|---|
| 7,170,954 B2 | 1/2007 | Hassibi et al. |
| 7,224,744 B2 | 5/2007 | Giannakis et al. |
| 7,280,604 B2 | 10/2007 | Giannakis et al. |
| 7,397,866 B2 | 7/2008 | Hwang et al. |
| 7,567,623 B2 | 7/2009 | Nam et al. |
| 7,599,444 B2 | 10/2009 | Ashikhmin |
| 7,609,782 B2 | 10/2009 | Giannakis et al. |
| 7,706,454 B2 | 4/2010 | Giannakis et al. |
| 7,864,876 B2 | 1/2011 | Nam et al. |
| 7,864,880 B2 | 1/2011 | Giannakis et al. |
| 8,059,747 B1 * | 11/2011 | Orlik ............ H04L 1/0054 375/261 |

* cited by examiner

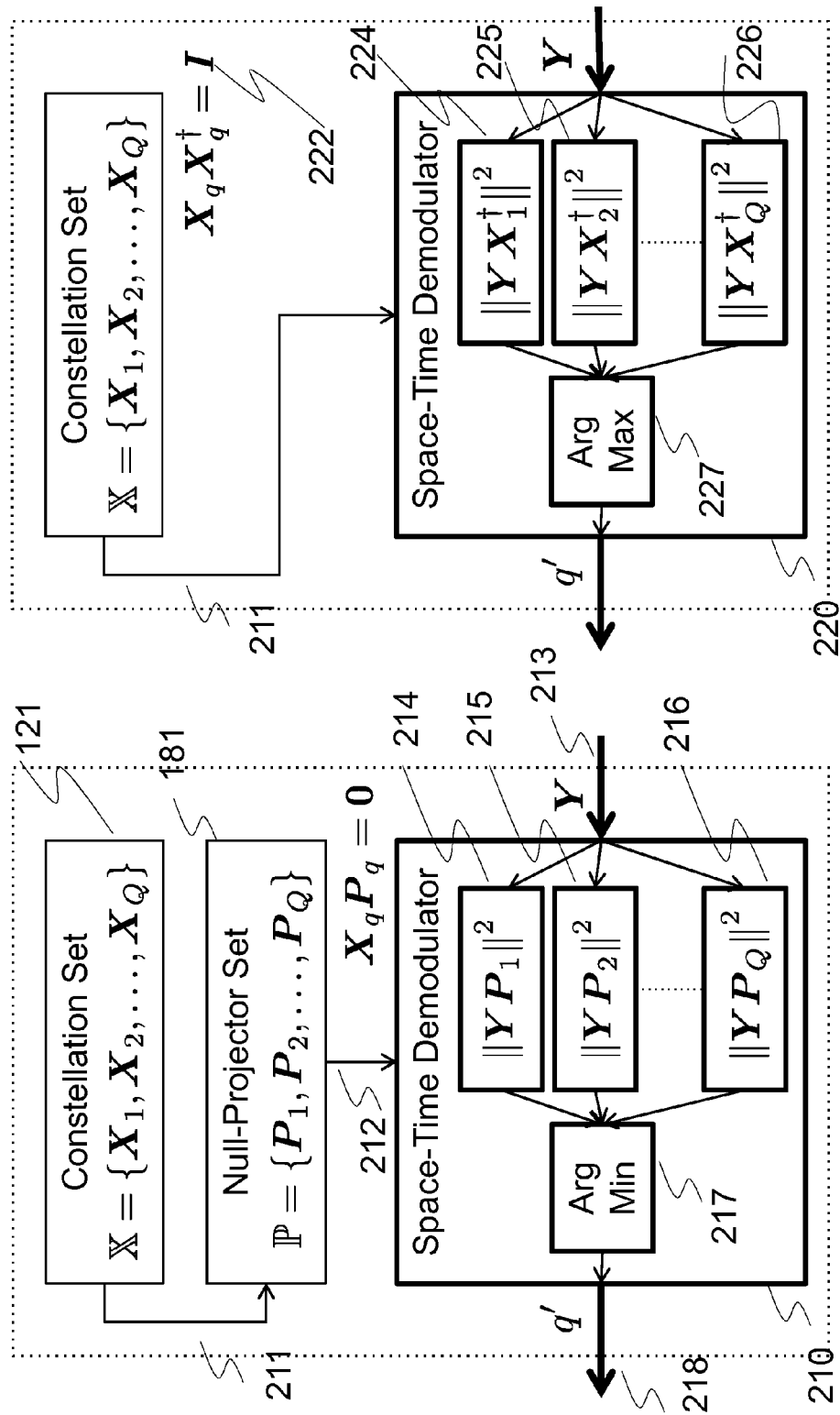

$$610 \quad \frac{1}{\sqrt{21}} F \begin{bmatrix} 0 & 0 & 0 & 0 & 0 & 0 & 0 & -7 \\ 0 & 0 & 0 & 0 & 0 & 0 & -5 & 0 \\ 0 & 0 & 0 & 0 & 0 & -3 & 0 & 0 \\ 0 & 0 & 0 & 0 & -1 & 0 & 0 & 0 \\ 0 & 0 & 0 & +1 & 0 & 0 & 0 & 0 \\ 0 & 0 & +3 & 0 & 0 & 0 & 0 & 0 \\ 0 & +5 & 0 & 0 & 0 & 0 & 0 & 0 \\ +7 & 0 & 0 & 0 & 0 & 0 & 0 & 0 \end{bmatrix}$$

Fig. 6A

$$620 \quad \frac{1}{2\sqrt{2}} F^\dagger \begin{bmatrix} e^{j\pi \frac{0}{8}} & 0 & 0 & 0 & 0 & 0 & 0 & 0 \\ 0 & e^{j\pi \frac{1}{8}} & 0 & 0 & 0 & 0 & 0 & 0 \\ 0 & 0 & e^{j\pi \frac{2}{8}} & 0 & 0 & 0 & 0 & 0 \\ 0 & 0 & 0 & e^{j\pi \frac{3}{8}} & 0 & 0 & 0 & 0 \\ 0 & 0 & 0 & 0 & e^{j\pi \frac{4}{8}} & 0 & 0 & 0 \\ 0 & 0 & 0 & 0 & 0 & e^{j\pi \frac{5}{8}} & 0 & 0 \\ 0 & 0 & 0 & 0 & 0 & 0 & e^{j\pi \frac{6}{8}} & 0 \\ 0 & 0 & 0 & 0 & 0 & 0 & 0 & e^{j\pi \frac{7}{8}} \end{bmatrix}$$

Fig. 6B

$$630 \quad \frac{1}{2\sqrt{42}} \begin{bmatrix} 0 & 0 & 0 & 0 & 0 & 0 & 0 & +7e^{j\pi \frac{7}{8}} \\ 0 & 0 & 0 & 0 & 0 & 0 & +5e^{j\pi \frac{6}{8}} & 0 \\ 0 & 0 & 0 & 0 & 0 & +3e^{j\pi \frac{5}{8}} & 0 & 0 \\ 0 & 0 & 0 & 0 & +1e^{j\pi \frac{4}{8}} & 0 & 0 & 0 \\ 0 & 0 & 0 & -1e^{j\pi \frac{3}{8}} & 0 & 0 & 0 & 0 \\ 0 & 0 & -3e^{j\pi \frac{2}{8}} & 0 & 0 & 0 & 0 & 0 \\ 0 & -5e^{j\pi \frac{1}{8}} & 0 & 0 & 0 & 0 & 0 & 0 \\ -7e^{j\pi \frac{0}{8}} & 0 & 0 & 0 & 0 & 0 & 0 & 0 \end{bmatrix}$$

Fig. 6C

SYSTEM AND METHOD FOR COMMUNICATING DATA SYMBOLS VIA WIRELESS DOUBLY-SELECTIVE CHANNELS

FIELD OF THE INVENTION

This invention relates generally to digital communications, and more particularly to transmitting high-speed data via wireless doubly-selective channels.

BACKGROUND OF THE INVENTION

In wireless communications, doubly-selective channels are subject to time-varying fading and multi-path delays. Time-varying fading has a specific Doppler power spectrum, causing time-selective channels and inter-carrier interference (ICI). Multi-path delays have a certain delay power spectrum, causing frequency-selective channels and inter-symbol interference (ISI). This is a particular problem in a wideband wireless network with mobile transceivers, e.g. in vehicular communications networks and cellular networks.

Adaptive equalization and pilot symbols are typically used to compensate for ISI and ICI. For example, pilot symbols or training sequences are inserted in packets transmitted to a receiver in order to estimate channel state information (CSI) of wireless links. The estimated CSI is used for equalization of ISI and ICI. However, the pilot symbols inherently reduce the spectral efficiency and data transmission rate, given restricted resources of radio frequency that is suited for mobile communications. Moreover, the pilot symbols are only effective for slow fading channels. In addition, channel estimation to obtain instantaneous CSI is considerably difficult in doubly-selective fading channels due to the presence of both ISI and ICI, even with pilot symbols.

A basis expansion model (BEM) has been used to approximate singly-selective fading channels, i.e., either time-varying or multi-path channels, to realize semi-blind transmissions for mobile wireless communications, see, e.g., U.S. Pat. No. 7,280,604 B2. The BEM is used in conjunction with an iterative semi-blind equalizer based on an expectation-and-maximization (EM) procedure for joint data detection and CSI estimation. With help of a forward error correction (FEC) code, the BEM can realize quasi non-coherent communications with a small number of pilot symbols without performance degradation. However, that method still relies on pilot symbols to obtain an initial CSI estimation and FEC soft-decision decoding feedbacks, which can make a receiver more complicated.

Differential space-time coding (DSTC) has been used to realize non-coherent communications and to provide diversity gain to be robust against channel fading, see, e.g., U.S. Pat. No. 7,567,623 B2, U.S. Pat. No. 7,508,808 B2, and U.S. Pat. No. 7,397,866 B2. The non-coherent communications do not need to use any pilot symbols, and higher spectral efficiency can be maintained because of no communications overhead. DSTC is realized by Grassmannian orthogonal matrix, see, e.g., U.S. Pat. No. 6,801,579 B1, U.S. Pat. No. 7,864,876 B2, and US 2002/0163892 A1. However, DSTC does not perform well in fast time-varying channels, where channel coherence time is very short to exploit the orthogonal feature of the Grassmannian matrix. To solve this problem, the BEM and DSTC can be simultaneously used with generalized likelihood-ratio test (GLRT) equalization, see, e.g., U.S. Pat. No. 8,059,747. With BEM, non-coherent communications can be realized even for fast time-varying fading channels and for high-speed data rate transmissions. This method and system can be extended to doubly-selective fading channels by introducing multi-dimensional BEM, in which two different kinds of basis functions over time and frequency domain are used to deal with doubly-selective fading channels.

However, the BEM itself is susceptive to some hardware imperfections, such as timing offset and carrier offset. For example, the timing and carrier offsets can be caused by hardware impairments, such as inaccuracy of a clock circuit including, e.g., a crystal oscillator. Such offsets are undesired for a number of applications, and can be compensated for by a specially designed synchronization process. For example, U.S. Pat. No. 7,961,697 B2 describes a method for synchronizing clocks between the receiver and transmitter using pre-defined training sequences in synchronization packets. However, transmission of the synchronization packets causes additional communications overhead, which is an undesirable or even unacceptable for a number of applications.

Accordingly, there is a need for a method for non-coherent transmission for doubly-selective channels accounting for timing offset and carrier offset of the transmission without relying on any pilots or training sequences for synchronization and channel estimation.

SUMMARY OF THE INVENTION

The embodiments of the invention provide a method and a system for non-coherent wireless telecommunications accepting timing and carrier offsets via multiple-input multiple-output (MIMO) doubly-selective channels, that are subject to time-varying fading and multi-path delays for radio transceivers equipped with multiple antennas. Time-varying fading causes inter-carrier interference (ICI) and multi-path delays create inter-symbol interference (ISI). The method realizes non-coherent MIMO communications that can avoid using pilot symbols for estimating channel state information (CSI) of wireless links even in the presence of ICI and ISI. To account for ICI and ISI, one embodiment uses a multi-dimensional basis expansion model (BEM) to cope with doubly-selective fading channels, and a blind equalization based on generalized likelihood ratio test (GLRT).

The issue of timing and carrier offsets for GLRT with BEM is resolved by some embodiments of the invention, which are based on a realization that statistical dependency of the channels used in recovery of the transmitted data can be modified with statistical dependency of distribution of the timing and carrier offsets. In such a manner, the statistical recovery of the transmitted data considers the probable offsets values without using any additional synchronization data.

Some embodiments of the invention are based on additional realization that the statistics of the timing and carrier offsets resemble the statistics of the distribution of the Doppler frequency of the received signals. This is because the autocorrelation function of timing and carrier offsets can be well approximated by Taylor-Maclaurin series expansion. To that end, it was realized that the distribution of the offsets values has a Legendre polynomial basis. Accordingly, some embodiments of the invention modify the statistical dependency of the channels used in recovery of the transmitted data with the polynomial basis.

The BEM uses a conditional channel covariance, which is based on the Legendre polynomial basis in a time domain, and on a Fourier exponential basis in a frequency domain. To account for the timing offset, some embodiments modify the Fourier basis in the frequency domain of the BEM with a Legendre polynomial basis, and use the Fourier-Legendre product basis for the frequency domain. Also, some embodiments account for the carrier offset by increasing the number of Legendre polynomial basis functions considered in the time domain of the BEM. To that end, high-speed non-coherent MIMO communications can be realized with a significant tolerance against all the ISI, ICI, timing offset, and carrier offset, even without using pilot symbols.

In one embodiment, the GLRT blind equalization can be modified to take noise and signal uncertainty into account. For example, the null-space projection for space-time demodulation is replaced with a quasi null-space projection, whose demodulation metric is generated as a function of noise and signal variances as well as basis-expanded signal block.

Accordingly, one embodiment discloses a method for decoding data symbols received at a receiver via doubly-selective fading channel in a multiple-input multiple output (MIMO), and wherein each data symbol is space-time modulated with a corresponding codeword from a constellation set of codewords, wherein each codeword in the constellation set is a complex-valued matrix of size N-by-L, where N is a number of transmitting antennas and L is a length of transmission.

The method includes expanding the constellation set of codewords with a set of basis functions to produce a basis-expanded constellation set, wherein the set of basis functions includes a Fourier exponential basis function in a frequency domain, a Legendre polynomial basis function in a time domain, and a Fourier-Legendre product basis function in the frequency domain, wherein the Fourier-Legendre product basis function is a function of element-wise products of the Legendre polynomial basis function and the Fourier exponential basis function over the frequency domain; projecting a received modulated data symbol onto orthogonal complements of the basis expanded constellation set to obtain a set of distance metric of a generalized likelihood ratio test (GLRT) for each codeword of the constellation set; selecting a codeword corresponding to a minimal distance metric or a maximal correlation metric; and decoding the data symbol from the received modulated data symbol using the codeword.

Another embodiment discloses a receiver having a set of antennas for receiving a radio frequency (RF) signal from a transmitter via doubly-selective fading channel, wherein the RF signal includes a sequence of data symbols, each data symbol is space-time modulated with a corresponding codeword from a constellation set of codewords, wherein each codeword in the constellation set is a complex-valued matrix. The receiver comprises an RF circuit for down-converting the received RF signal from a carrier frequency to produce a baseband signal, wherein a carrier offset between the carrier frequency at the receiver and the carrier frequency at the transmitter generates additional noise at the receiver; a filter having a time-reversed impulse response of a filter of the transmitter for filtering the baseband signal to produce a filtered signal, wherein a time offset between a clock of the filter of the receiver and a clock of the filter of the transmitter generates additional inter-carrier interference (ICI) at the receiver; a space-time demodulator for demodulating the filtered signal using a generalized likelihood ratio test (GLRT) with multi-dimensional basis expansion model (BEM) to produce demodulated signal including the most likely estimation of the data symbols modulated with the corresponding codeword, wherein the GLRT uses a projector matrix that is an orthogonal null space of each codeword of the constellation set expanded with a set of basis functions including a Fourier exponential basis function in a frequency domain modified with a Legendre polynomial basis function; and a forward error correction (FEC) decoder for decoding the demodulated signal to produce an estimate of the transmitted data symbols.

Yet another embodiment discloses a system for communicating a radio frequency (RF) signal via a doubly-selective fading channel including a transmitter for producing the RF signal including a sequence of data symbols, each data symbol is space-time modulated with a corresponding codeword from a constellation set of codewords, wherein each codeword in the constellation set is a complex-valued matrix, and for transmitting the RF signal over the doubly-selective fading channel; and a receiver for receiving the RF signal and for demodulating the data symbols using a generalized likelihood ratio test (GLRT) with multi-dimensional basis expansion model (BEM), wherein the GLRT uses projector matrices orthogonal to each codeword of the constellation set expanded with a set of basis functions, wherein the set of basis functions includes a Fourier exponential basis function in a frequency domain, a Legendre polynomial basis function in a time domain, and a Fourier-Legendre product basis function in the frequency domain, wherein the Fourier-Legendre product basis function is a function of element-wise products of the Legendre polynomial basis function and the Fourier exponential basis function over the frequency domain.

BRIEF DESCRIPTION OF THE DRAWINGS

FIGS. 2A and 2B are block diagrams of a method for blind equalization with space-time demodulation for flat fading channels using principles employed by some embodiments of the invention;

FIGS. 6A, 6B and 6C are examples of the basis extension matrix used by some embodiments of the invention.

DETAILED DESCRIPTION OF THE PREFERRED EMBODIMENTS

System and Method Overview

Figure 1:
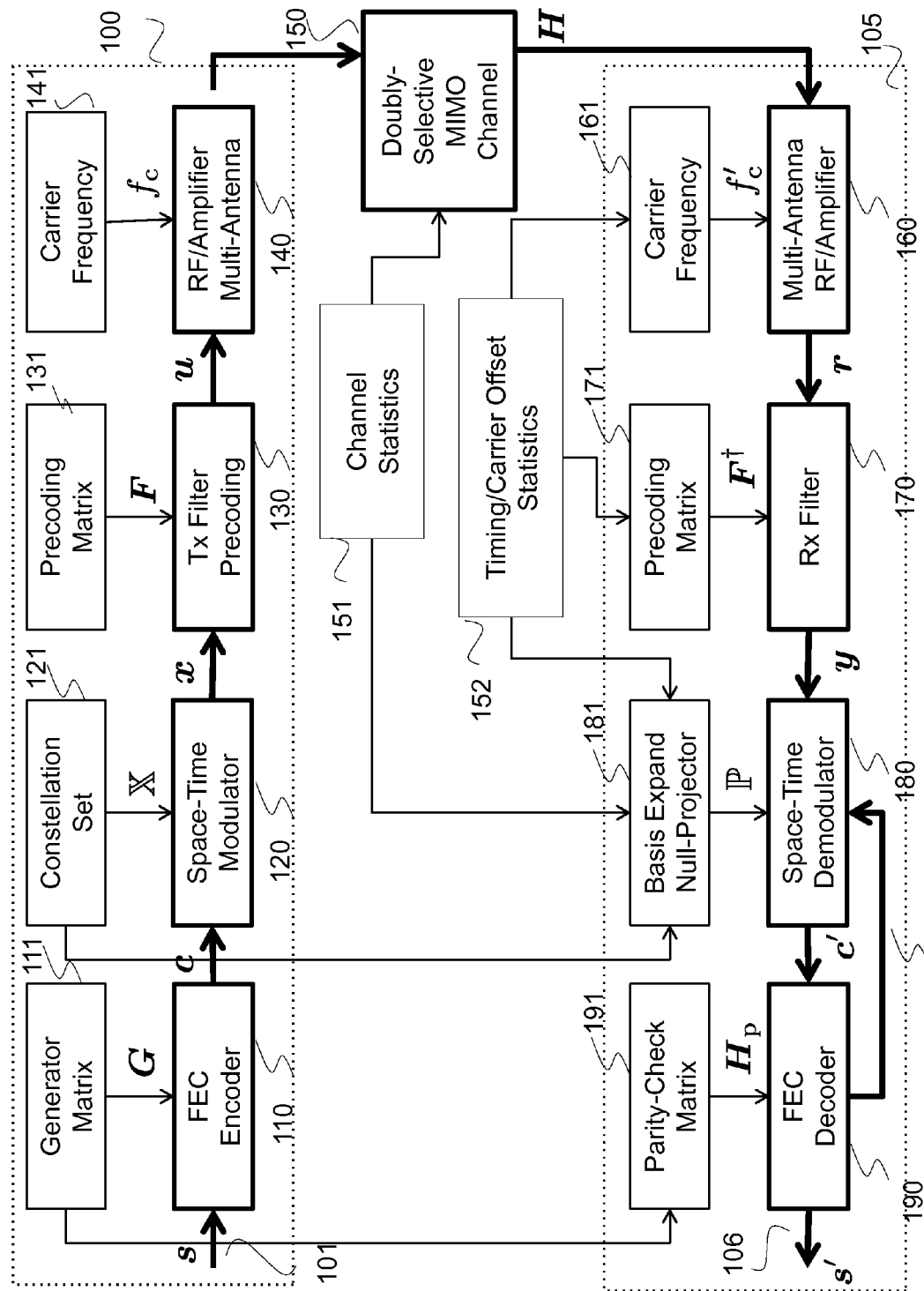
FIG. 1 is a block diagram of a method and system for non-coherent communications via doubly-selective fading MIMO channels according to some embodiments of the invention.

FIG. 1 shows a block diagram of a method and a system for wireless communications between a transmitter 100 and a receiver 105 via a multiple-input multiple-output (MIMO) doubly-selective channel 150, that is subject to time-varying fading and multi-path delays for transceivers equipped with multiple antennas, according to some embodiments of the invention. The time-varying fading causes time-selective channels with inter-carrier interference (ICI), and the multi-path delays cause frequency-selective channels with inter-symbol interference (ISI). Some embodiments of the invention can transmit high-speed data even for the case where the transceivers move extremely fast, e.g., for cellular telephones carried in bullet trains and airplanes. Moreover, one embodiment of the invention can realize non-coherent transmissions, which do not rely on any pilot symbols or training sequences used for estimating channel state information (CSI).

At the transmitter 100, a sequence of data symbols 101, i.e., s, is encoded by a forward-error correction (FEC) encoder 110 to produce a sequence of encoded data symbols, i.e., c. The FEC encoder 110 can use capacity-approaching codes, e.g., low-density parity-check (LDPC) codes, turbo codes, repeat-accumulate codes, or other similar codes. For latency-critical applications, short-length FEC codes, e.g., Bose-Chaudhuri-Hocquenghem, Reed-Muller, Reed-Solomon, and Preparata codes, may apply. The FEC encoder 110 typically uses a generator matrix 111, i.e., G, which is multiplied by the data symbols s in an algebraic domain, e.g., with a non-binary Galois field or Lee ring. The encoded data c include some parity symbols appended by the generator matrix G so that the receiver 105 can recover the original data s as decoded data s' 106 even in the presence of errors over the wireless networks.

The encoded data symbols c are block-wise modulated by a space-time modulator 120 to produce a sequence of modulated data symbols, i.e., x. The space-time modulator uses a Q-ary constellation set 121 of $X = \{X_1, X_2, \ldots, X_Q\}$, wherein a codeword $X_q$ is a complex-valued matrix of size N-by-L, where N is the number of transmitter antennas and L is the length of block transmissions. The modulation cardinality Q determines the maximum data rate; a bit per symbol rate is defined as $\log_2(Q)/L$. In some embodiments of the invention, the space-time modulator uses a Grassmannian block code such that each codeword is orthogonal to be $X_q^\dagger X_q = I_L$, where $[.]^\dagger$ denotes a conjugate transpose and $I_L$ is an identity matrix of size L.

The space-time modulation is based on a constellation set $X = \{X_1, X_2, \ldots, X_Q\}$ 121 using space-time coding (STC), such as space-time block code (STBC), space-frequency block code (SFBC), and space-time-frequency block code (STFBC). For example, the Grassmannian block code is realized by an exponential conformal mapping or by the Cayley transform of a skew-Hermitian matrix. The block code can also include quasi-unitary beta-distributed space-time modulations, and can be concatenated with trellis coding. For example, the Grassmannian block codes can enable non-coherent communications, in which no pilot symbols are required, because of the orthogonality of the block code. Therefore, the spectral efficiency loss due to pilot insertion overheads can be avoided. In one embodiment, a few pilot symbols with small overheads are optionally inserted to improve performance.

The sequence of modulated data symbols x are submitted into a band-pass filter 130 to produce a sequence of filtered symbols u by multiplying a precoding matrix 131, i.e., F. For example, one embodiment uses a root-raised cosine filter. In some embodiments of the invention, to suppress the impact of ISI, the precoding matrix F uses the discrete Fourier transform as a method of orthogonal-frequency-division multiplexing (OFDM), with or without cyclic prefix. For example, the precoding matrix based on the Fourier transform includes $$[F]_{i,j} = \frac{1}{\sqrt{L}} \exp(j2\pi ij/L),$$

wherein $[.]_{i,j}$ denotes the (i,j)-th element of a matrix and $j = \sqrt{-1}$ is an imaginary unit. In another embodiment, the other precoding and filtering with power and rate adaptation over space, time, and frequency domains can be applied concurrently. For example, unitary spatial precoding to reduce the impact of antenna correlation can be used in addition to the OFDM precoding.

The filtered symbols u are up-converted and amplified to the radio-frequency (RF) signal by an RF circuit 140 and transmitted via the channel by N transmitting antennas. The number of antennas N can be any arbitrary integer greater than or equal to one. The RF circuit produces the RF signal having a carrier frequency 141 of $f_c$. As an example, the carrier frequency is about 2.4 GHz. The RF signals are transmitted to the receiver 105 through the wireless channel 150.

For wideband mobile communications, the wireless channel 150 is doubly-selective fading channel, in which time-varying fading causes time-selective channels with ICI and multi-path delays cause frequency-selective channels with ISI. From physics, the channel matrix H has some statistical property 151 in both time and frequency domains.

The channel statistics 151 over the time domain can be characterized by the Doppler power spectrum. For example, the relative velocity between the transmitter and the receiver can determine the maximum possible Doppler frequency as $f_D = f_c v/c_0$, where $f_D$ is the maximum Doppler frequency, v is the relative velocity, and $c_0$ is the speed of light in the air. For rich-scattering environments, the distribution of the Doppler frequency is modeled by Jakes model, in which the time-varying fading over the time domain has an auto-correlation function characterized by the zero-th order Bessel function of the first kind as $J_0(2\pi f_D \tau)$, where $\tau$ is the time difference. In particular for mobile transceivers moving fast, e.g., in planes and bullet trains, the time-varying fading causes non-negligible time-selective channels with strong ICI.

Depending on environmental conditions such as locations, velocities, and materials of scattering objects, the channel matrix H has a specific delay power spectrum due to multi-path delays, which cause frequency-selective channels. In particular for wideband transmissions, the frequency-selective channels cause strong ISI. The channel statistics 151 over the frequency domain can be characterized by the delay power spectrum. For example, the delay power spectrum is modeled by an exponential decay, in which the average power of the multi-paths exponentially degrades as the delay increases.

With a set of receiving antennas and RF circuits 160, the receiver 105 receives the transmitted RF signals impaired by amplifier noise and channel fading during the transmission via the wireless channel 150. The number of receiving antennas is denoted as M, which can be any arbitrary integer grater than or equal to one. The receiver can include at least one processor for performing functions of one or multiple modules of the receiver.

The RF circuit 160 down-converts the received RF signal to produce a sequence of baseband received signals r, using a carrier frequency 161 of $f'_c$. The receiver carrier frequency 161 is equal to the transmitter carrier frequency 141. However, having an identical carrier frequency at both the transmitter 100 and the receiver 105 is practically difficult due to hardware imperfection for clock circuits, e.g., crystal oscillators. The carrier offset has a certain statistical property 152 derived from the law of physics. For example, the uncertainty of carrier frequency for some crystal oscillators can be modeled by the Cauchy-Lorentz distribution. The offset between these carrier frequencies, i.e., $\delta f = f'_c - f_c$, creates an additional phase noise at the receiver. The issue of the carrier offset is addressed by the methods employed by some embodiments of the invention.

The baseband received signals r are passed through a receiver filter 170 to produce a sequence of filtered received signals y. The receiver filter 170 can be based on a matched filter, which has a time-reversed impulse response of the transmitter filter 130. For example, the receiver filter 170 uses a precoding matrix 171, which is a conjugate transpose of the transmitter precoding matrix F 131. When multiplying the precoding matrix with the baseband received signals r, the receiver needs a block-wise timing synchronization. Due to clock circuit imperfections and a propagation delay over the wireless channels, the timing synchronization is difficult to be achieved in practice. The timing offset has a certain statistical property 152, such as the Cauchy-Lorentz distribution. The uncertain timing offset creates an additional ICI. The issue of the timing offset is also addressed by the methods employed by some embodiments of the invention.

The filtered received signals y are submitted into a space-time demodulator 180 to produce a sequence of demodulated signals c'. The space-time demodulator 180 estimates the most likely data symbol c modulated by the space-time modulator 120. To realize non-coherent MIMO communications, the space-time demodulator performs blind equalization without knowledge of instantaneous channel state information H. For example, some embodiments of the invention use a generalized likelihood ratio test (GLRT) with multi-dimensional basis expansion model (BEM). The GLRT blind equalization uses a null-space projector set $\mathbb{P} = \{P_1, P_2, \ldots, P_Q\}$ 181. The projector matrix is an orthogonal null space of each codeword of the space-time constellation set $\mathbb{X} = \{X_1, X_2, \ldots, X_Q\}$ 121 such that $X_q P_q = 0$ holds.

To account for doubly-selective fading channels, the projector matrix is generated by multi-dimensional BEM, which can use channel statistics knowledge 151. The multi-dimensional BEM is based on Legendre polynomial basis in the time domain, but on Fourier exponential basis in the frequency domain. In addition, to account for the timing and carrier offsets, the BEM is also based on the statistical knowledge of the offsets 152. For example, to account for the timing offset, some embodiments of the invention modify the Fourier basis of the frequency domain of the BEM with a product of the Legendre polynomial basis functions. Also, some embodiments of the invention account for the carrier offset by increasing the number of the Legendre basis functions considered in the time domain of the BEM.

The demodulated signals c' are decoded by an FEC decoder 190 to produce the decoded data s' 106 for the estimate of the transmitted data symbols s 101. For example, the FEC decoder uses belief propagation for LDPC codes. The belief propagation uses an iterative message-passing algorithm based on a sparse graph represented by a parity-check matrix $H_p$ 191. The parity-check matrix $H_p$ 191 is an algebraic null-space projection of the generator matrix G 111, such that $H_p G = 0$ over the Galois field or the Lee ring. The FEC decoder can correct some possible errors in the demodulated signals c'.

In one embodiment, the soft-decision information at the FEC decoder 190 is fed back 192 to the space-time demodulator 180 to refine the demodulated signals. This loop can iterate until a termination condition is reached. For example, the termination condition is based on the convergence of the data likelihood, or a predetermined number of iterations.

Space-Time Demodulation with GLRT

FIG. 2A shows a schematic of the space-time demodulation 180 for the non-coherent MIMO equalization based on GLRT having some principles employed by some embodiments of the invention. The method of FIG. 2A can demodulate space-time constellations without using any pilot symbols and training sequences, but is suboptimal for handling doubly-selective fading channels and timing/carrier offsets.

For the transmission via flat fading channels, the filtered signals y over L symbols can be expressed as $$Y = HX + Z,$$

where $Y = [y_1, y_2, \ldots, y_L]$ is the filtered signal matrix of size M-by-L, X is the transmitted space-time modulation from the constellation set of $\mathbb{X}$, and Z is an additive noise matrix of the same size. In some embodiments, the transmitter and receiver precoding matrices over the time domain are unitary such that $FF^\dagger = I_L$. The noise includes, e.g., thermal noise at the receiver amplifier, and can follow the circular-symmetry complex Gaussian distribution with a covariance of $E[ZZ^\dagger] = \sigma^2 I_L$. For the coherent communications, the receiver can estimate the instantaneous CSI matrix H by using pilot symbols or training sequences, and demodulates as follows $$q' = \arg\min_{q \in \{1,2,\ldots,Q\}} \|Y - HX_q\|^2,$$

where the receiver searches for the most likely constellation having the minimum Euclidean distance.

The coherent communications require pilot symbols to estimate CSI. To avoid using pilot symbols, the space-time demodulator 210 employing GLRT uses the null-space projector set $\mathbb{P} = \{P_1, P_2, \ldots, P_Q\}$ 181, and searches for the most likely data symbol of the received signal 213 corresponding to the minimum norm 217 over all possible norm metrics 214, 215, and 216 as follows $$q' = \arg\min_{q \in \{1,2,\ldots,Q\}} \|Y P_q\|^2,$$

where the null-space projector matrix 181 is orthogonal to each codeword constellation 121 such that $X_q P_q = 0$ 212. For example, the null-projector matrix can be generated 211 from the constellation as follows $$P_q = I_L - X_q^\dagger (X_q X_q^\dagger)^{-1} X_q,$$

where the projector matrix is a size of L-by-L. Since the null-space projection is not unique, there are many other expressions. Moreover, the minimum possible size of null-space projection matrix is L-by-(L−N) because the codeword constellation already uses N basis vectors. Because of the orthogonality and in the absence of the noise, the GLRT norm metric becomes zero regardless of the values of the CSI matrix H.

Thus, the GLRT blind equalization can demodulate the data even without any CSI matrix knowledge. Because the receiver is impaired by the amplifier noise Z, in practice, the product of the filtered received signal block Y with the null-space projector matrix $P_q$ can be non-zero, but still smaller than the product of Y with the other projector matrix of different constellation $P_{q'}$, with a high probability.

FIG. 2B shows the space-time demodulator 220 employing the simplified GLRT, which does not need the null-space projector matrix $\mathbb{P} = \{P_1, P_2, \ldots, P_Q\}$ but the constellation set $\mathbb{X} = \{X_1, X_2, \ldots, X_Q\}$ 211 directly. If the codeword constellation is the Grassmannian manifold such that $X_q^\dagger X_q = I_L$ 222, the GLRT blind equalization can be simplified without any performance degradation. The simplified GLRT performs a correlator to search for the most likely data having the maximum norm 227 over all possible correlation metrics 224, 225, and 226 as follows $$q' = \arg\min_{q \in \{1,2,\ldots,Q\}} \|YX_q^\dagger\|^2.$$

Multi-Dimensional BEM for Doubly-Selective Fading Channels

Some embodiments of the invention are based on a recognition that the space-time demodulation of FIGS. 2A and 2B is suboptimal for handling time- and frequency-selective fading channels because the orthogonal feature cannot be exploited due to a shorter coherence time and coherence bandwidth. To solve this problem, the data symbols are decoded using GRLT equalization method with basis expansion model (BEM). With BEM, non-coherent communications can be realized even for fast time-varying fading channels or for dispersive frequency-selective fading channels.

However, this GRLT equalization method with BEM performs well for singly-selective fading channels not doubly-selective fading channels. Some embodiments of the invention use a multi-dimensional BEM to cope with doubly-selective fading channels, by introducing two different kinds of basis functions over time and frequency domains. These embodiments of the invention are based on a realization that the channel fluctuations over the time and frequency domains have a certain statistical dependency characterized by time-frequency auto-correlation functions and a few dominant basis functions in the channel statistics are sufficient for data recovery even without knowing the instantaneous CSI.

Figure 3A:
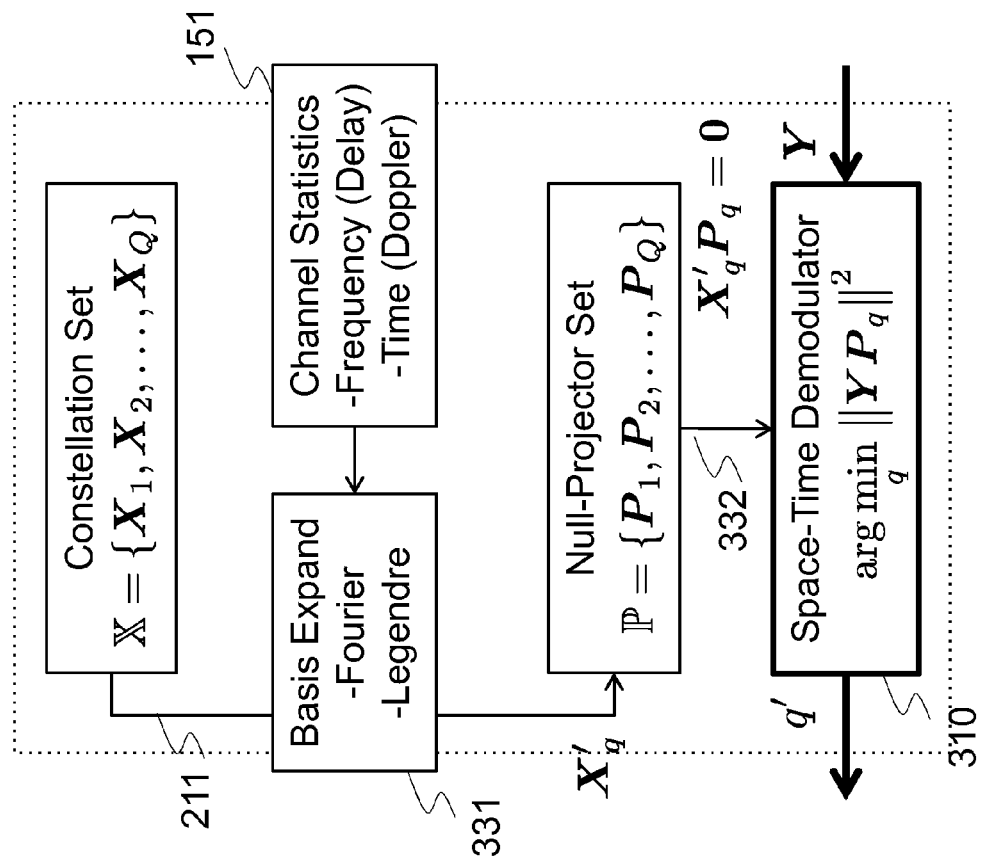
FIG. 3A is a block diagram of a method for blind equalization with space-time demodulation based on multi-dimensional basis expansion model (BEM) to account for statistical dependency of distribution of doubly-selective fading channels according to some embodiments of the invention.

FIG. 3A shows a schematic of the space-time demodulator employing GLRT with multi-dimensional BEM according to some embodiments of the invention. The steps of the space-time demodulator 310 is based on the null-space projection as $q'=\arg\min_{q \in \{1, 2, \ldots, Q\}}\|YP_q\|^2$, which is analogous to the space-time demodulator 210 in FIG. 2A, given the null-space projector set $P = \{P_1, P_2, \ldots, P_Q\}$ 332. This embodiment of the invention uses the channel statistics 151 to generate a different null-space projector set 332 by a basis expansion 331 for each codeword constellation 211. More specifically, the null-space projector matrix $P_q$ is not only orthogonal to the space-time constellation $X_q$ but also orthogonal to a basis-expanded constellation $X_q B_d$, where $B_d$ is the d-th basis expansion matrix of size L-by-L. With the basis expansion matrices $\{B_1, B_2, \ldots, B_D\}$ based on the channel statistics 151, the basis expansion 331 is carried out for each constellation $X_q$ 211 to produce a full basis-expanded constellation $X'_q$ as follows:

$$X'_q = \begin{bmatrix} X_q \\ X_q B_1 \\ \vdots \\ X_q B_D \end{bmatrix} = (I_{D+1} \otimes X_q)B,$$

where an operator $\otimes$ denotes a Kronecker product, and B is a full basis expansion matrix of size L(D+1)-by-L, comprising of $\{I_L, B_1, B_2, \ldots, B_D\}$. The number D of basis expansion matrices depends on the channel statistics, but is constrained as N(D+1)<L due to the theoretical limitation of degrees of freedom in the null-space. The full basis-expanded constellation $X'_q$ is a size of N(D+1)-by-L. The null-space projector matrix $P_q$ 332 is orthogonal to the full basis-expanded constellation $X'_q$, e.g., as follows:

$$P_q = I_L - X'^\dagger_q (X'_q X'^\dagger_q)^{-1} X'_q,$$

where the projector matrix is a size of L-by-L.

The channel statistics 151 are based on physics and environments, and define the Doppler power spectrum and the delay power spectrum. According to the Doppler power spectrum, the channel varies in the time domain, whereas the channel varies in the frequency domain according to the delay power spectrum. The channel variations are based on a stochastic random process, but there is a statistical dependency over the time and frequency domains according to time-frequency auto-correlation functions. For the Jakes model, the time auto-correlation function can be expressed as the Bessel function, whose Taylor-Maclaurin series expansion is written as $$J_0(2\pi f_D \tau) = \sum_{m=0}^{\infty} (-1)^m \left(\frac{\pi f_D \tau}{m!}\right)^{2m} = 1 - (\pi f_D \tau)^2 + \frac{1}{4}(\pi f_D \tau)^4 + \ldots,$$

which suggests that the stochastic random process can be well described by a set of polynomial basis functions for each term. The first constant term corresponds to the zero-th order polynomial function with an eigenvalue of L. And, the second quadratic term corresponds to the first order polynomial function with an eigenvalue of $$\frac{L}{6}(L^2 - 1)(\pi f_D T_s)^2,$$

where $T_s$ is a symbol duration. Any arbitrary realization of the random time-varying channels can be expressed by a weighted sum of the Legendre basis functions. With the GLRT and BEM, no actual weight coefficients are needed to demodulate. Correspondingly, some embodiments of the invention use the discrete orthogonal Legendre polynomial (DOLP) basis functions in the time domain of BEM to account for time-varying fading channels.

For example, the m-th element of the n-th Legendre basis function is expressed as $$\varphi_{n,m} = \sqrt{\frac{(2m+1)(L-1)^{[m]}}{(L+m)^{[m+1]}}} \sum_{v=0}^{m} (-1)^v \binom{m}{v} \binom{m+v}{v} \frac{n^{[v]}}{(L-1)^{[v]}},$$

where $x^{[m]}=x(x-1)\ldots(x-m+1)$ is a factorial power. The basis expansion matrix 331 with the n-th Legendre basis function is generated as follows $$B_n = F \operatorname{diag}(\varphi_{n,1}, \varphi_{n,2}, \ldots, \varphi_{n,L})F^\dagger,$$

where diag(.) denotes a diagonal matrix consisting of the arguments. Note that the precoder matrix F is multiplied to transform into the time domain. The Legendre basis function can approximate any realization of stochastic random process in the Jakes model up to reasonably fast fading channels, i.e., no more 10% maximum Doppler frequency normalized by block length. In one embodiment, the Legendre basis is modified to sinusoidal basis for extremely fast fading channels by calculating the dominant eigenvectors of the auto-correlation function. The time-domain basis (Legendre polynomial basis) is used to deal with ICI. For most fast fading channels, two-basis expansion is sufficient to address ICI.

As well as the time-domain basis expansion, the multi-dimensional BEM uses the frequency-domain basis expansion to account for ISI, according to the channel statistics 151. For exponentially decaying delay power spectrum, the auto-correlation function over the frequency domain can be expressed by the Fourier series as $$\frac{a-1}{a\exp(j2\pi f T_s)-1} = (a-1)\sum_{m=0}^{\infty} a^{T_s m} \exp(-j2\pi f T_s m),$$

where $$a = 10^{-\frac{\alpha}{10}}$$

is the power delay profile at the symbol delay with a being the decay factor in dB. The above frequency-domain auto-correlation suggests that the stochastic random process over the frequency domain can be well approximated by a set of the Fourier exponential basis functions. The m-th element of the n-th Fourier basis function is expressed as $$\psi_{n,m} = \frac{1}{\sqrt{L}} \exp\left(-\frac{j2\pi nm}{L}\right),$$

which is equivalent to the (n,m)-th entry of the Fourier transform matrix. In some embodiments of the invention, the basis expansion matrix 331 with the m-th Fourier basis function is generated as follows $$B_m = \mathrm{diag}(\psi_{m,1}, \psi_{m,2}, \ldots, \psi_{m,L}),$$

where the precoder matrix F is assumed to be the inverse Fourier transform matrix for OFDM such that the filtered received signal y is already transformed into the frequency domain.

Some embodiments of the invention use the multi-dimensional basis expansion 331 with both Legendre basis functions over the time domain and Fourier basis functions over the frequency domain depending on the channel statistics 151. To that end, the embodiments of the invention in FIG. 3A can account for both ISI and ICI in doubly-selective fading channels, by choosing dominant basis expansion matrices $B_n$ to generate the full basis-expanded constellation $X'_q$ and the corresponding null-space projector matrix $P_q$.

In one embodiment, the channel statistics 331 provide the delay power spectrum, the Doppler power spectrum, the maximum Doppler frequency, or the root-mean-square multipath delay. Notice that the actual maximum Doppler frequency does not change the basis functions expect for an unusual Doppler spectrum, but the required number of basis functions can change.

In another embodiment, the multi-dimensional basis expansion 331 uses the Legendre basis over the time domain, and the Fourier basis over the frequency domain regardless of the actual channel statistics. For example, predetermined number (e.g., 2 or 3) of Legendre basis and Fourier basis functions can be used for doubly-selective fading channels even without any knowledge of channel statistics. In one embodiment, considering a spatial auto-correlation function, the multi-dimensional BEM uses a set of basis functions over the spatial domain to deal with a spatial correlation caused by line-of-sight channels or antenna coupling.

Multi-Dimensional BEM for Timing and Carrier Offset Recovery

Although the embodiments in FIG. 3A can deal with doubly-selective fading channels, the performance can further degrade when there is timing offset and carrier offset. Some embodiments of the invention provide a method for non-coherent transmission via doubly-selective channels accounting for the timing offset and the carrier offset between the transmitter and the receiver. The embodiments are based on a realization that statistical dependency of the channels used in recovery of the transmitted data can be modified with statistical dependency of distribution of the timing and carrier offsets. In such a manner, the statistical recovery of the transmitted data considers the probable offsets values without using any additional exchange of synchronization data.

Figure 3B:
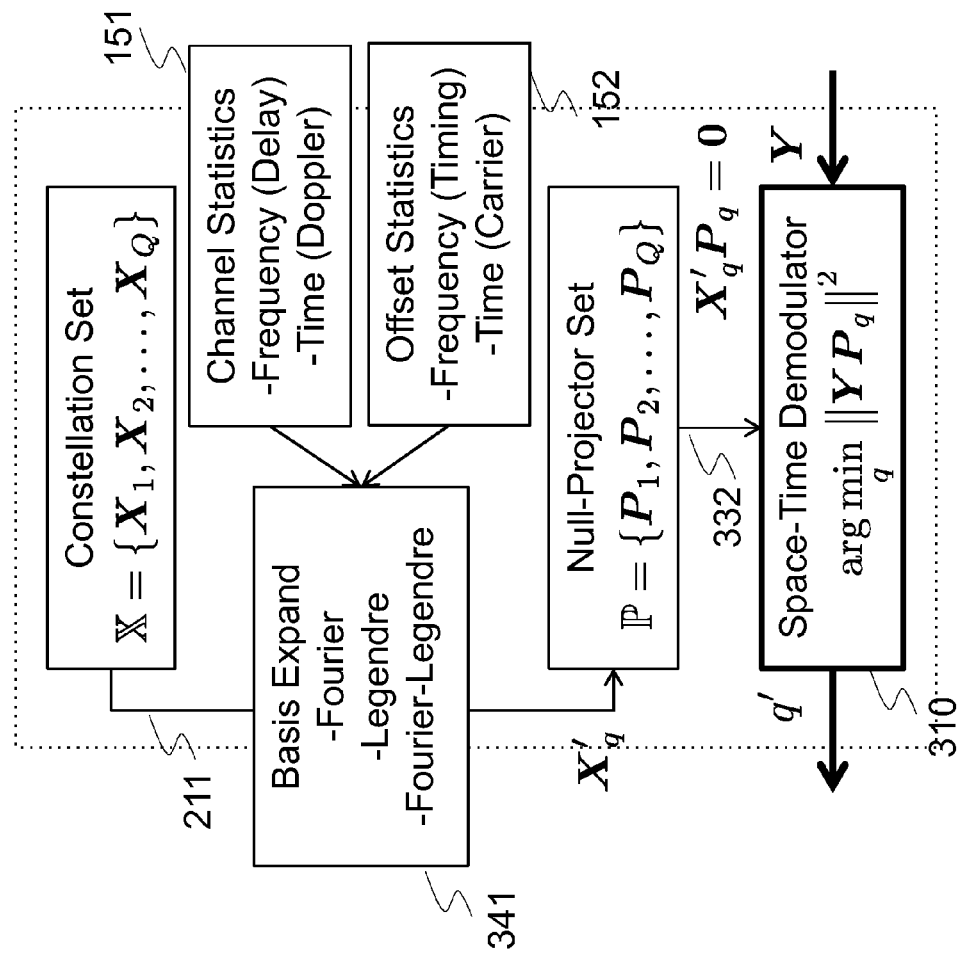
FIG. 3B is a block diagram of a method for blind equalization with space-time demodulation based on multi-dimensional BEM to account for statistical dependency of distribution of timing and carrier offsets according to some embodiments of the invention.

FIG. 3B shows a block diagram of the space-time demodulator 180 using a modified multi-dimensional basis expansion 341 that accounts for the statistical dependency of distribution of the timing and carrier offsets 152 according to some embodiments of the invention. The space-time demodulator provides the most likely data by finding a minimum norm value among all possible products of the filtered received signals block Y with corresponding projector matrices $P_q$ 332. These steps are identical to the space-time demodulator 210 in FIG. 2A. Each projector matrix $P_q$ 332 is produced based on the multi-dimensional basis expansion 341 of a corresponding constellation $X_q$ 211 such that the product of the projector matrix $P_q$ 332 with a full basis-expanded constellation $X'_q$ 341 is zero or near-zero within some precision digits.

To account for ISI and ICI in doubly-selective fading channels, the multi-dimensional basis expansion 341 first uses the channel statistics 151. For example, the Legendre basis functions and the Fourier basis functions are used in the time domain and the frequency domain, respectively. Next, in accordance with the realization that statistics of the timing and carrier offsets 152 resemble the statistics of the distribution of the Doppler frequency, further expand the constellation with other basis functions to account for the timing and carrier offsets. In that regard, the null-space projector matrices 332 are also modified to result in zero value products with the corresponding basis-expanded constellations.

The timing offset causes phase noise over the frequency domain, and the carrier offset causes phase rotation over the time domain. The statistics of both the timing offset and the carrier offset are usually based on hardware imperfection of clock circuits, e.g., phase-locked loop with crystal oscillators. The distribution of the timing offset can be the Cauchy-Lorentz distribution, the Gaussian distribution, the uniform distribution, 2-point, or 3-point distributions depending on the hardware and system. The phase noise over the frequency domain due to the timing offset has a certain auto-correlation function.

For example, the auto-correlation functions are expressed as $$\mathbb{E}[\exp(j2\pi f \delta)] = \begin{cases} \exp(-2(\pi f \Delta)^2) = 1 - 2(\pi f \Delta)^2 + \ldots\,, & \text{Gaussian}, \\ \mathrm{sinc}(2\pi f \Delta) = 1 - \frac{2}{3}(\pi f \Delta)^2 + \ldots\,, & \text{Uniform}, \\ \cos^2(\pi f \Delta) = 1 - (\pi f \Delta)^2 + \ldots\,, & \text{3Point}, \\ \cos(2\pi f \Delta) = 1 - 2(\pi f \Delta)^2 + \ldots\,, & \text{2Point}, \end{cases}$$

for the Gaussian distribution with a standard deviation of $\Delta$, the uniform distribution, the 3-point distribution, and 2-point distribution with a maximum offset of $\Delta$, respectively. The Taylor-Maclaurin series expansion suggests that a stochastic random process of the phase noise for these different distributions can be well described by the Legendre polynomial basis functions as the Doppler frequency distribution of Jakes model. Comparing to the Jakes Doppler power spectrum, the phase noise due to the timing offset may have a different eigenvalue depending on the distribution, but the basis functions do not change for all different distributions.

From the above statistical viewpoint of the timing and carrier offsets, some embodiments of the invention introduce other basis functions, which are the element-wise product of the Legendre basis functions and the Fourier basis functions over the frequency domain. This new basis functions can account for ISI due to the frequency-selective channels and also phase noise due to the timing offset. The basis expansion matrix 341 for the new basis functions is expressed as $$B_{nm} = \mathrm{diag}(\phi_{n,1}\psi_{m,1}, \phi_{n,2}\psi_{m,2}, \ldots, \phi_{n,2}\psi_{m,L}),$$

which is a diagonal matrix in the frequency domain, and the diagonal entry is a product of the n-th Legendre basis function $\phi_n$ and the m-th Fourier basis function $\psi_m$. To account for the phase noise due to the carrier offset, the methods do not introduce new basis functions, but the number of the Legendre basis functions can be increased in the time domain because the time-domain basis functions for both ICI and the carrier offset are the Legendre basis functions.

As a practical consequence of the method in FIG. 3B, the null-space projector matrix set $\mathbb{P}$ 332 has specific properties. More specifically, the values of the projector matrix $P_q$ are selected such that a product of the projector matrix $P_q$ with the original constellation matrix $X_q$ is zero, and products of the projector matrix $P_q$ with the basis-expanded constellation matrix $X_q B_d$ are also zero (within practical precision digits). For example, the projector matrix is generated as $P_q = I_L - X'^\dagger_q (X'_q X'^\dagger_q)^{-1} X'_q$ for the full basis-expanded constellation $X'_q$. The basis expansion matrix $B_d$ is based on three kinds of basis functions; the Legendre basis function in the time domain to account for ICI and the carrier offset, the Fourier basis function in the frequency domain to account for ISI, and the Fourier-Legendre product basis function in the frequency domain to account for ISI and the timing offset.

Linear-Complexity Inflating-Block GLRT Blind Equalization

In some embodiments, the space-time modulator 120 uses differential space-time coding (DSTC) to generate the Q-ary Grassmannian constellations of size N-by-L. Suppose that the block length is relatively long to be a multiple of the number of antennas as $L = N\mathcal{L}$, where $\mathcal{L}$ is an integer greater than one. The DSTC provides a scalable method for a successive construction of the high-order long Grassmannian constellation by a smaller set of unitary matrices of size N-by-N. For example, the unitary constellation is obtained by an exponential mapping of a skew-Hermitian matrix as follows:

$$U_m = \exp(\Sigma \mathcal{M}[c_k] A_k - \mathcal{M}[c_k]^* A_k^\dagger),$$

where $\exp(.)$ is a matrix exponential function, $\mathcal{M}[.]$ is a standard quadrature-amplitude modulation (QAM), and $A_k$ is a pre-defined matrix of size N-by-N. Alternatively, the unitary constellation is generated by a Caylay transform of a skew-Hermitian matrix. The cardinality of the unitary constellations can be reduced to $$Q' = Q^{\frac{1}{\mathcal{L}-1}}$$

to send a data rate of $\log_2(Q)/L$. The unitary matrix of size N-by-N is sequentially multiplied to construct the Grassmannian constellation $X_q$ of size N-by-L as follows $$X_q = [I_N, U_1, U_1 U_2, U_1 U_2 U_3, \ldots, \Pi_{m=1}^{\mathcal{L}-1} U_m].$$

In some embodiments of the invention, with the above successive modulation based on unitary constellations, the space-time demodulator 180 is also simplified to have a linear complexity for blind equalization. The methods can reduce the computational complexity if the cardinality Q is extremely large to perform brute-force search over all possible norm metrics for GLRT.

Figure 4:
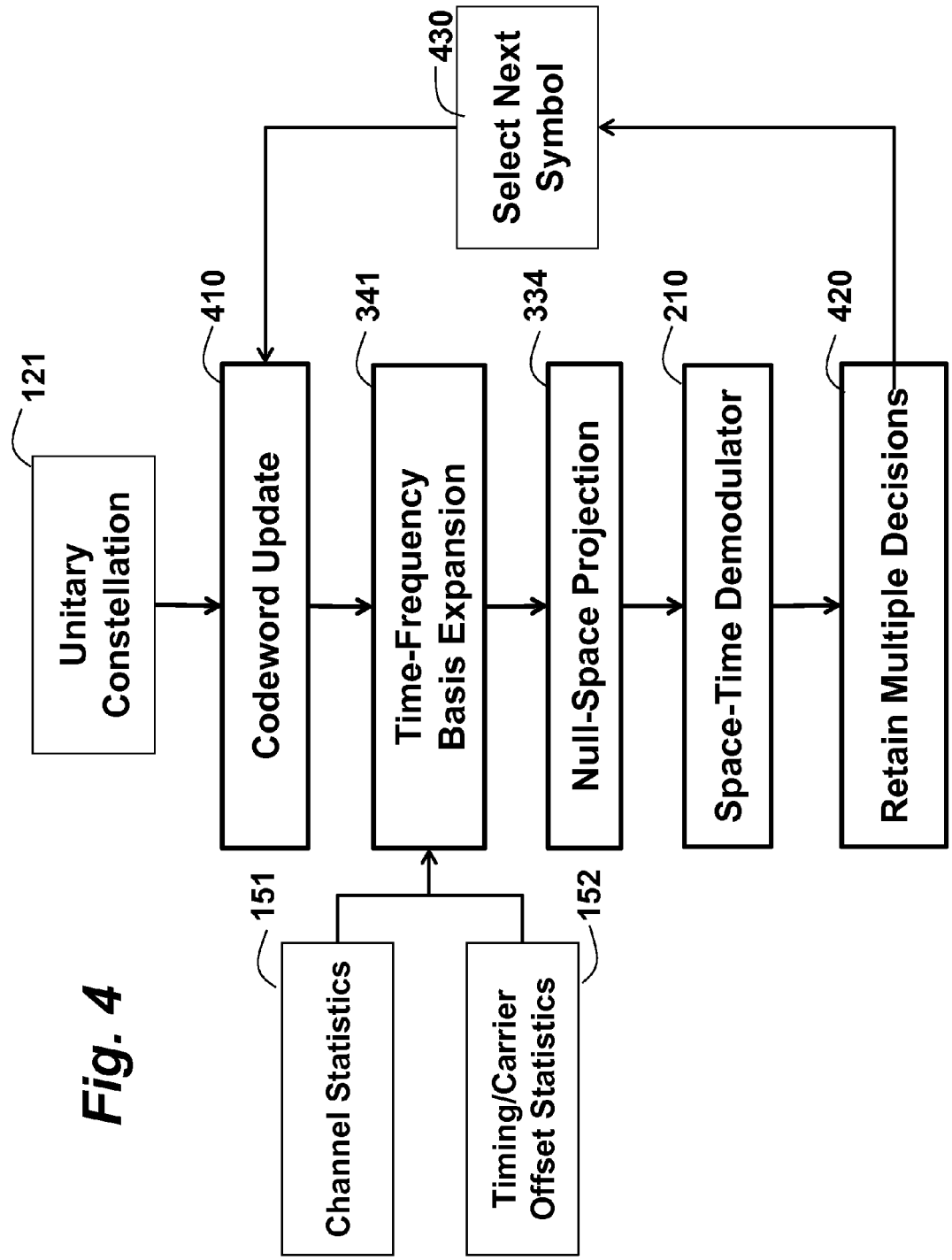
FIG. 4 is a flow chart of a method for a linear-complexity blind equalization with space-time demodulation using successive null-projection block update according to some embodiments of the invention.

FIG. 4 shows a flow chart of the successive space-time demodulation according to these embodiments of the invention. The methods of the space-time demodulation use a set of unitary constellation $U_m$ 121. The codeword is initialized as $X_q = [I_N, 0, 0, 0, \ldots, 0]$ at the beginning. The codeword is first updated 410 as $X_q = [I_N, U_1, 0, 0, \ldots, 0]$ for the next symbol 430. This codeword is expanded 341 by the multi-dimensional BEM, which uses the Legendre basis functions, the Fourier basis functions, and the Fourier-Legendre product basis functions according to the channel statistics 151 and the timing/carrier offset statistics 152. Based on the full basis-expanded constellation $X'_q$, the corresponding null-space projector matrix is generated 334, e.g., by $$P_a = I_L - X'^\dagger_q (X'_q X'^\dagger_q)^{-1} X'_q.$$

The minimum norm metric is searched by the space-time demodulator employing GLRT 210, as $q' = \arg\min_{q \in \{1, 2, \ldots, Q'\}} \|Y P_q\|^2$, where the number of metric computations is greatly reduced from the original GLRT of Q to the successive GLRT of Q'.

To avoid discarding potential minimum values over the all cardinality of Q by hard decision, some embodiments retain a few candidates 420 as a method of soft-decision M-algorithm. For example, as well as the most likely data, which give the minimum norm metric, several data which also have small norm metrics are considered as candidates for the next symbols. The retained candidates are successively updated 410 by increasing the non-zero entry in the codeword constellation $X_q$. For example, the next codeword is updated as $X_q = [I_N, U_1, U_1 U_2, 0, \ldots, 0]$ for the second unitary matrix $U_2$. The next symbol is not necessarily the consecutive symbol. In one embodiment, the next symbol is selected 430 depending on the expected signal power. For example, the next codeword can be updated reversely as $X_q = [I_N, U_1, 0, \ldots, 0, U_2]$. The successive GLRT computes the basis-expanded constellation and the null-space projector matrix in real-time, and the computational complexity for the minimum value search in GLRT can be reduced to a linear order.

In yet another embodiment, when precise channel statistics are available, the null space projection can be improved to generalized nulling with a noise variance and eigenvalues of the channel covariance. The multi-dimensional basis expansion provides an equivalent signal model as follows $$Y = H'X' + Z',$$

where H' is an equivalent channel matrix after basis expansion, and Z' is an equivalent noise including the approximation error of the basis expansion. This embodiment uses the different metric for GLRT rather than $\|YP_q\|^2$. For example, the modified GLRT uses the noise variance information if available as follows $$q' = \arg\min_{q \in \{1,2,\ldots,Q\}} tr[Y^\dagger Y(\sigma^2 I_L + X'_q X'^\dagger_q)^{-1}] + \log\det[\sigma^2 I_L + X'_q X'^\dagger_q],$$

where tr[.] is a matrix trace, and det[.] is a matrix determinant. This metric is based on the maximum likelihood, and the performance can be improved by accounting for the noise variance.

Figure 5:
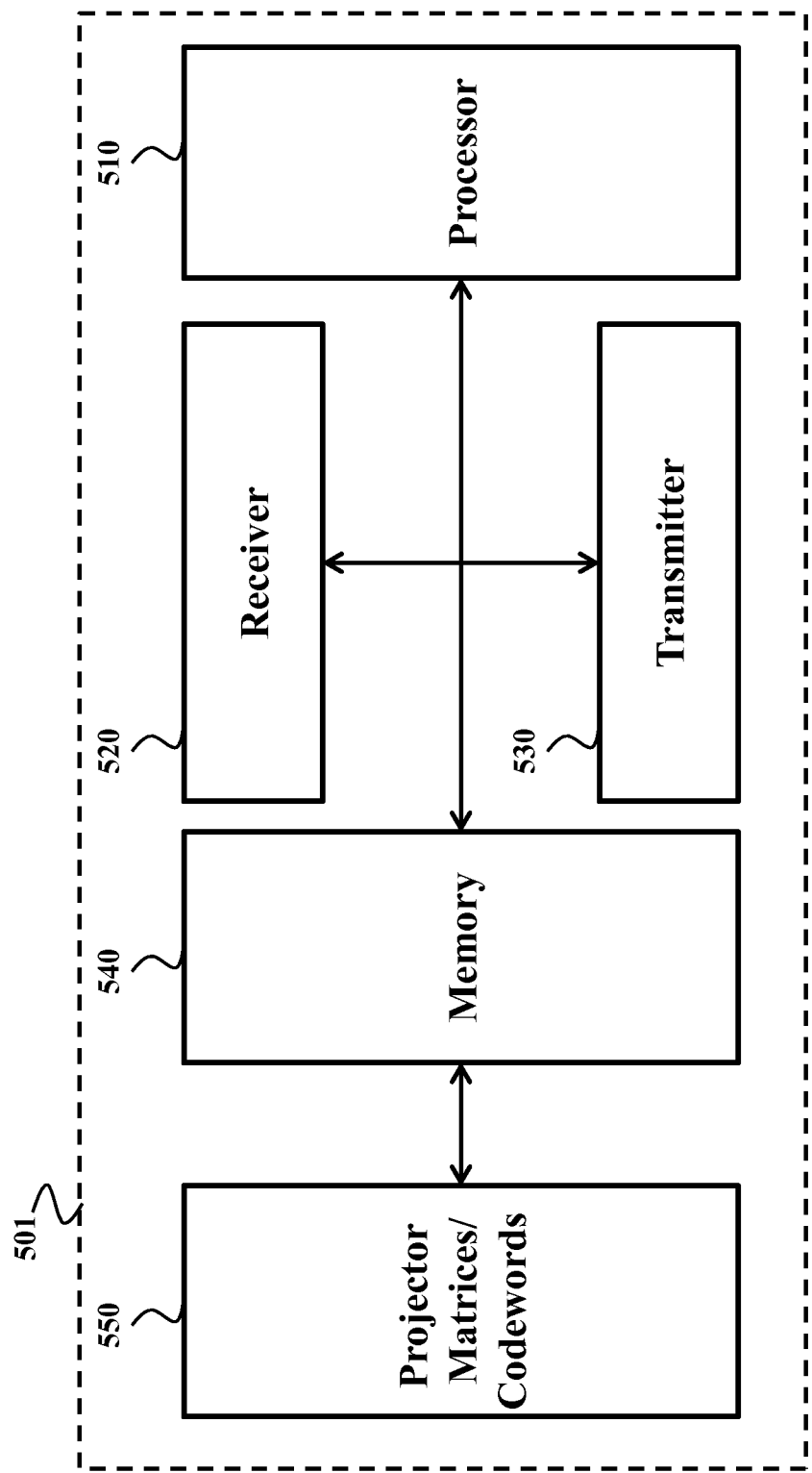
FIG. 5 is a block diagram of a transceiver according to some embodiments of the invention.

FIG. 5 shows a block diagram of a transceiver 501 according to some embodiments of the invention. The transceiver 501 includes, e.g., a receiving 520, transmitting 530 circuits, a processor 510 for signal processing, and a memory 540 for storing encoding/decoding and modulating/demodulating data. For example, the memory can store 550 the constellation set used for modulating the data symbols. Additionally or alternatively, the memory can store the projectors matrices predetermined for demodulating the codewords according to various embodiments of the invention.

For example, the memory 540 stores 550 each projector matrix predetermined for the constellation set, such that a product of the projector matrix with the corresponding codeword is zero, and a product of the projector matrix with the corresponding codeword multiplied by a basis extension matrix is also zero. In some embodiments, the basis extension matrix includes a Legendre polynomial basis matrix, a Fourier exponential basis matrix, and a Fourier-Legendre product basis matrix.

FIGS. 6A, 6B and 6C show non-limiting examples of the basis extension matrix according to some embodiments of the invention. FIG. 6A shows an example of a Legendre polynomial basis matrix 610, wherein values on a diagonal of the Legendre polynomial basis matrix form a polynomial function. FIG. 6B shows an example of a Fourier exponential basis matrix 620, wherein values on a diagonal of the Fourier exponential basis matrix form a Fourier exponential function. FIG. 6C shows an example of a Fourier-Legendre product basis matrix 630, wherein values on a diagonal of the Fourier-Legendre product basis matrix are formed by an element-wise product of the Legendre polynomial basis and the Fourier exponential basis matrixes.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding data symbols received at a receiver via doubly-selective fading channel in a multiple-input multiple output (MIMO), and wherein each data symbol is space-time modulated with a corresponding codeword from a constellation set of codewords, wherein each codeword in the constellation set is a complex-valued matrix of size N-by-L, where N is a number of transmitting antennas and L is a length of transmission, where N and L are non-zero positive integers, comprising:

expanding the constellation set of codewords with a set of basis functions to produce a basis-expanded constellation set, wherein the set of basis functions includes a Fourier exponential basis function in a frequency domain, a Legendre polynomial basis function in a time domain, and a Fourier-Legendre product basis function in the frequency domain, wherein the Fourier-Legendre product basis function is a function of element-wise products of the Legendre polynomial basis function and the Fourier exponential basis function over the frequency domain;

projecting a received modulated data symbol onto orthogonal complements of the basis expanded constellation set to obtain a set of distance metric of a generalized likelihood ratio test (GLRT) for each codeword of the constellation set;

selecting a codeword corresponding to a minimal distance metric or a maximal correlation metric; and decoding the data symbol from the received modulated data symbol using the selected codeword.

2. The method of claim 1, wherein the expanding further comprises:

increasing a number of the Legendre polynomial basis functions considered in the time domain depending on statistics of carrier offset.

3. The method of claim 1, further comprising:

modifying the GLRT with a variance of noise of the channel and eigenvalues of covariance of the channel.

4. The method of claim 1, wherein the expanding of each codeword $X_q$ from the constellation comprises:

determining a basis-expanded codeword $X'_q$ according to $$X'_q = \begin{bmatrix} X_q \\ X_q B_1 \\ \vdots \\ X_q B_D \end{bmatrix} = (I_{D+1} \otimes X_q)B,$$

where an operator $\otimes$ denotes a Kronecker product, and B is a full basis expansion matrix comprising $\{I_L, B_1, B_2, \ldots, B_D\}$, wherein D is a number of basis expansion matrices constrained as $N(D+1) \leq L$, $I_L$ is an identity matrix of size L, wherein L is a length of a transmitted block, and N is a number of transmitting antennas, where N and L are non-zero positive integers.

5. The method of claim 1, wherein the projecting comprises:

determining, for each basis-expanded codeword $X'_q$, a null-space projector matrix $P_q$ orthogonal to the basis-expanded codeword $X'_q$, according to $$P_q = I_L - X'^\dagger_q (X'_q X'^\dagger_q)^{-1} X'_q,$$

wherein be $X^\dagger_q X_q = I_L$, where $[.]^\dagger$ denotes a conjugate transpose, $I_L$ is an identity matrix of size L, L is a length of a transmitted block, where L is a non-zero positive integer, and wherein the projector matrix is a size of L-by-L; and projecting the received modulated data symbol onto each projector matrix to determine the codeword corresponding to the minimal distance metric.

6. The method of claim 1, wherein the Legendre polynomial basis function is modified to sinusoidal basis by calculating dominant eigenvectors of an auto-correlation function, wherein at least two-basis expansion terms of the Fourier exponential basis function and the Legendre polynomial basis function are selected for the expanding.

7. The method of claim 1, wherein the expanding comprises:

determining a basis expansion matrix $B_n$ for an n-th Legendre polynomial basis function over the time domain according to $$B_n = F \, \mathrm{diag}(\phi_{n,1}, \phi_{n,2}, \ldots, \phi_{n,L}) F^\dagger,$$

wherein F is a precoding matrix, $[.]^\dagger$ denotes a conjugate transpose, wherein the precoding matrix is unitary such that $FF^\dagger=I_L$, wherein $I_L$ is an identity matrix of size L, L is a length of a transmitted block, where L is a non-zero positive integer, diag(.) denotes a diagonal matrix of arguments, wherein the m-th element of the n-th Legendre polynomial basis function is $$\varphi_{n,m} = \sqrt{\frac{(2m+1)(L-1)^{[m]}}{(L+m)^{[m+1]}}} \sum_{v=0}^{m} (-1)^v \binom{m}{v}\binom{m+v}{v} \frac{n^{[v]}}{(L-1)^{[v]}},$$

where $x^{[m]}=x(x-1)\ldots(x-m+1)$ is a factorial power, and v is an integer number;
determining a basis expansion matrix $B_m$ for an m-th Fourier exponential basis function according to $$B_m = \text{diag}(\psi_{m,1}, \psi_{m,2}, \ldots, \psi_{m,L}),$$

wherein the n-th element of the m-th Fourier exponential basis function is $$\psi_{n,m} = \frac{1}{\sqrt{L}} \exp\left(-\frac{j2\pi nm}{L}\right),$$

wherein exp(.) is an exponential function, j is an imaginary unit, $\pi$ is a constant; and
determining a basis expansion matrix $B_{nm}$ for the Fourier-Legendre product basis function according to $$B_{nm} = \text{diag}(\phi_{n,1}\psi_{m,1}, \phi_{n,2}\psi_{m,2}, \ldots, \phi_{n,2}\psi_{m,L}),$$

wherein the basis expansion matrix $B_{n,m}$ is a diagonal matrix in the frequency domain, and a diagonal entry is an element-wise product of the n-th Legendre polynomial basis function $\phi_n$ and the m-th Fourier exponential basis function $\psi_m$.

8. The method of claim 7, wherein the projecting comprises:
determining, for each codeword $X_q$, a projector matrix $P_q$ such that a product of the projector matrix $P_q$ with the codeword $X_q$ is zero, and products of the projector matrix $P_q$ with the basis-expanded matrices $X_q B_n$, $X_q B_m$, and $X_q B_{nm}$ are zero.

9. The method of claim 1, further comprising:
determining the constellation set as a Grassmannian constellation $X_q$ of size N-by-L, wherein N is a number of transmitting antennas, where N and L are non-zero positive integers, $L=N\mathcal{L}$, and $\mathcal{L}$ is an integer greater than one, according to $$X_q = [I_N, U_1, U_1 U_2, U_1 U_2 U_3, \ldots, \Pi_{m=1}^{\mathcal{L}-1} U_m],$$

wherein $$U_m = \exp(\Sigma \mathcal{M}[c_k]A_k - \mathcal{M}[c_k]^* A_k^\dagger),$$

where exp(.) is a matrix exponential function, $\mathcal{M}[.]$ is a quadrature-amplitude modulation, $A_k$ is a pre-defined matrix of size N-by-N, $I_N$ is an identity matrix of size N, where $[.]^\dagger$ denotes a conjugate transpose.

10. A receiver having a set of antennas for receiving a radio frequency (RF) signal from a transmitter via doubly-selective fading channel, wherein the RF signal includes a sequence of data symbols, each data symbol is space-time modulated with a corresponding codeword from a constellation set of codewords, wherein each codeword in the constellation set is a complex-valued matrix, comprising:

an RF circuit for down-converting the received RF signal from a carrier frequency to produce a baseband signal, wherein a carrier offset between the carrier frequency at the receiver and the carrier frequency at the transmitter generates additional noise at the receiver;

a filter having a time-reversed impulse response of a filter of the transmitter for filtering the baseband signal to produce a filtered signal, wherein a time offset between a clock of the filter of the receiver and a clock of the filter of the transmitter generates additional inter-carrier interference (ICI) at the receiver;

a space-time demodulator for demodulating the filtered signal using a generalized likelihood ratio test (GLRT) with multi-dimensional basis expansion model (BEM) to produce demodulated signal including the most likely estimation of the data symbols modulated with the corresponding codeword, wherein the GLRT uses a projector matrix that is an orthogonal null space of each codeword of the constellation set expanded with a set of basis functions including a Fourier exponential basis function in a frequency domain modified with a Legendre polynomial basis function; and a forward error correction (FEC) decoder for decoding the demodulated signal to produce an estimate of transmitted data symbols.

11. The receiver of claim 10, wherein the set of basis functions includes a Fourier basis function, a Legendre polynomial basis function, and a function of pair-wise products of the Fourier and the Legendre polynomial basis functions.

12. The receiver of claim 10, wherein at least two Legendre polynomial basis functions are considered in the time domain.

13. The receiver of claim 10, wherein the space-time demodulator refines iteratively the demodulated signal using an output of the FEC decoder until a termination condition is reached.

14. The receiver of claim 10, further comprising:
a memory for storing the projector matrix predetermined for the constellation set, such that a product of the projector matrix with the corresponding codeword is zero, and a product of the projector matrix with the corresponding codeword multiplied by a basis extension matrix is zero, wherein the basis extension matrix includes a Legendre polynomial basis matrix, a Fourier exponential basis matrix, and a Fourier-Legendre product basis matrix, wherein values on a diagonal of the Legendre polynomial basis matrix form a polynomial function, wherein values on a diagonal of the Fourier exponential basis matrix form a Fourier exponential function, wherein values on a diagonal of the Fourier-Legendre products basis matrix are formed by an element-wise product of the Legendre polynomial basis and the Fourier exponential basis matrixes.

15. The receiver of claim 10, wherein the projector matrix $P_q$ of a size of L-by-L is determined orthogonal to a basis-expanded codeword $X'_q$ corresponding to a codeword $X_q$ according to $$P_q = I_L - X'_q{}^\dagger (X'_q X'_q{}^\dagger)^{-1} X'_q,$$

wherein be $X_q{}^\dagger X_q = I_L$, where $[.]^\dagger$ denotes a conjugate transpose, $I_L$ is an identity matrix of size L, L is a length of a transmitted block, and wherein the basis-expanded codeword $X'_q$ is $$X'_q = \begin{bmatrix} X_q \\ X_q B_1 \\ \vdots \\ X_q B_D \end{bmatrix} = (I_{D+1} \otimes X_q)B,$$

where an operator ⊗ denotes a Kronecker product, and B is the basis expansion matrix comprising $\{I_L, B_1, B_2, \ldots, B_D\}$, wherein D is a number of basis expansion matrices constrained as N(D+1)<L, $I_L$ is an identity matrix of size L, wherein L is a length of a transmitted block, and N is a number of transmitting antennas, where N and L are non-zero positive integers.

16. A system for communicating a radio frequency (RF) signal via a doubly-selective fading channel, comprising:
a transmitter for producing the RF signal including a sequence of data symbols, each data symbol is space-time modulated with a corresponding codeword from a constellation set of codewords, wherein each codeword in the constellation set is a complex-valued matrix, and for transmitting the RF signal over the doubly-selective fading channel; and
a receiver for receiving the RF signal and for demodulating the data symbols using a generalized likelihood ratio test (GLRT) with multi-dimensional basis expansion model (BEM), wherein the GLRT uses projector matrices orthogonal to each codeword of the constellation set expanded with a set of basis functions, wherein the set of basis functions includes a Fourier exponential basis function in a frequency domain, a Legendre polynomial basis function in a time domain, and a Fourier-Legendre product basis function in the frequency domain, wherein the Fourier-Legendre product basis function is a function of element-wise products of the Legendre polynomial basis function and the Fourier exponential basis function over the frequency domain.

17. The system of claim 16, wherein the transmitter comprises:
a forward-error correction (FEC) encoder for encoding the sequence of data symbols to produce a sequence of encoded data symbols;
a space-time modulator for a block-wise modulation of the encoded data symbols with the corresponding codeword from the constellation set of codewords to produce a sequence of modulated data symbols;
a band-pass filter for multiplying the modulated data symbols with a precoding matrix to produce a sequence of filtered symbols;
a transmitter RF circuit for up-converting and amplifying the filtered signal to produce the RF signal of a carrier frequency;
wherein the receiver comprises:
a receiver RF circuit for down-converting the received RF signal from the carrier frequency to produce a baseband signal, wherein a carrier offset between the carrier frequency at the receiver and the carrier frequency at the transmitter generates additional noise at the receiver;
a filter having a time-reversed impulse response of the band-pass filter of the transmitter for filtering the baseband signal to produce a filtered signal, wherein a timing offset between a clock of the filter of the receiver and a clock of the band-pass filter of the transmitter generates additional inter-carrier interference (ICI) at the receiver;
a space-time demodulator for demodulating the filtered signal using the GLRT generalized likelihood ratio test (GLRT) with multi-dimensional BEM to produce demodulated signal; and
a forward error correction (FEC) decoder for decoding the demodulated signal to produce an estimate of transmitted data symbols.

18. The system of claim 16, wherein at least two Legendre polynomial basis functions are considered in the time domain.

19. The system of claim 16, wherein the receiver includes a memory for storing each projector matrix predetermined for the constellation set, such that a product of the projector matrix with the corresponding codeword is zero, and a product of the projector matrix with the corresponding codeword multiplied by a basis extension matrix is zero, wherein the basis extension matrix includes a Legendre polynomial basis matrix, a Fourier exponential basis matrix, and a Fourier-Legendre product basis matrix, wherein values on a diagonal of the Legendre polynomial basis matrix form a polynomial function, wherein values on a diagonal of the Fourier exponential basis matrix form a Fourier exponential function, wherein values on a diagonal of the Fourier-Legendre product basis matrix are formed by a product of the Legendre polynomial basis and the Fourier exponential basis matrixes.

20. The system of claim 16, wherein a projector matrix $P_q$ of a size of L-by-L is determined orthogonal to a basis-expanded codeword $X'_q$ corresponding to a codeword $X_q$ according to $$P_q = I_L - X'_q{}^\dagger (X'_q X'_q{}^\dagger)^{-1} X'_q,$$

wherein be $X_q{}^\dagger X_q = I_L$, where $[.]^\dagger$ denotes a conjugate transpose, $I_L$ is an identity matrix of size L, L is a length of a transmitted block, and wherein the basis-expanded codeword $X'_q$ is $$X'_q = \begin{bmatrix} X_q \\ X_q B_1 \\ \vdots \\ X_q B_D \end{bmatrix} = (I_{D+1} \otimes X_q)B,$$

where an operator ⊗ denotes a Kronecker product, and B is the basis expansion matrix comprising $\{I_L, B_1, B_2, \ldots, B_D\}$, wherein D is a number of basis expansion matrices constrained as N(D+1)<L, $I_L$ is an identity matrix of size L, wherein L is a length of a transmitted block, and N is a number of transmitting antennas, where N and L are non-zero positive integers.

\* \* \* \* \*